United States Patent [19]

Sommer et al.

[11] Patent Number: 4,541,897
[45] Date of Patent: Sep. 17, 1985

[54] DISTILLATION PROCESS FOR THE PRODUCTION OF DEHYDRATED ETHANOL

[75] Inventors: August Sommer, Herne; Rainer Brücker, Castrop-Rauxel; Wilhelm Heitmann, Herne; Norbert Wozny, Marl, all of Fed. Rep. of Germany

[73] Assignee: Chemische Werke Huls Aktiengesellschaft, Marl, Fed. Rep. of Germany

[21] Appl. No.: 436,945

[22] Filed: Oct. 27, 1982

[30] Foreign Application Priority Data

Oct. 27, 1981 [DE] Fed. Rep. of Germany ....... 3142518

[51] Int. Cl.$^4$ .............................................. B01D 3/34
[52] U.S. Cl. ......................................... 203/19; 44/53; 44/56; 203/39; 203/69; 203/DIG. 13; 568/916
[58] Field of Search .................... 568/916; 435/161; 44/53, 56; 203/19, DIG. 13, 68–70, 71, 74, 75, 77, 78, 80, 81, 82, 84, 91, 93, 94, 39, 43–46; 426/494

[56] References Cited

U.S. PATENT DOCUMENTS 2,194,851  3/1940  Guinot ................................ 203/19

Primary Examiner—Frank Sever
Attorney, Agent, or Firm—Oblon, Fisher, Spivak, McClelland & Maier

[57] ABSTRACT

A distillation process for the production of dehydrated ethanol from dilute aqueous solutions of ethanol characterized in that the distillation is performed in a two-column system wherein the first column—for rectification—is operated under such a pressure that the second column—for dehydration—is heated exclusively with the vapors of the first column; in the first column the concentration of the dilute aqueous ethanol is effected to an ethanol concentration below the composition of the binary ethanol-water azeotrope; the separation of water is effected from the lower layer of the condensed head product of the second column; the separation of impurities and entrainers, having a lower boiling point than ethanol, is effected at the head of the first column and that of impurities, having a higher boiling point, above the feed point of the dilute aqueous solution in the first column; and, in the second column, the dehydration is effected by means of entrainers, with the addition of a fuel component or fuel, to which the ethanol is to be added, if required, while separating the aqueous phase as a head product.

25 Claims, 1 Drawing Figure

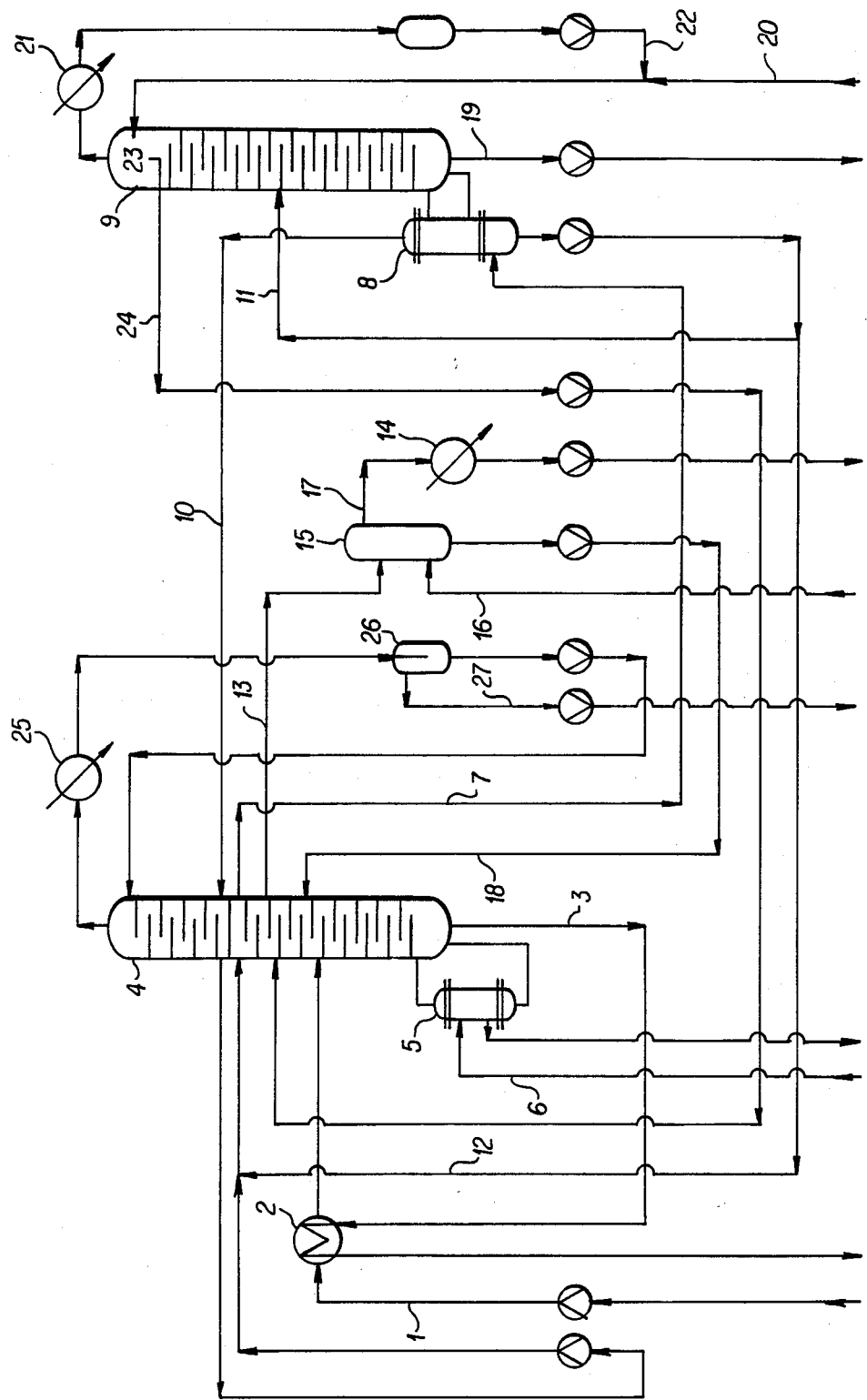

DISTILLATION PROCESS FOR THE PRODUCTION OF DEHYDRATED ETHANOL

BACKGROUND OF THE INVENTION

1. Field of the Invention

The process concerns a distillation system in which a water-free ethanol of a technical quality, usable as a fuel component for motor vehicle gasoline, can be obtained from crude ethanol in a particularly energy-saving manner. Additionally, an alternative of the process consists of using just a portion of the ethanol produced as a fuel component, while the predominant portion, also applicable as a fuel component, is quite definitely applicable for other purposes owing to its high degree of purity.

2. Description of the Prior Art

It is known from German Pat. No. 22 48 841 to remove water from isopropyl alcohol (which is similar to ethanol in many of its physical, chemical and fuel-technical properties) obtained by synthetic production from propylene and water in a two-column distillation system for fuel quality, and, to obtain it in a technical quality whereby the by-products of the synthesis are essentially not separated. The diisopropylether, which develops as a by-product of the synthesis, builds up initially in the dehydration column and is released with the produced water-free isopropylalcohol in the ratio of its development, serving in this instance as the entrainer during the dehydration. The separation of water is effected in the rectification column, which is operated under a higher pressure than the dehydration column, from the aqueous layer of the decanter for the head product of the dehydration column so that the heat content of the vapors of the rectification column can be used for the heating of the dehydration column.

It is, in a way, obvious to transfer this process to ethanol. However, in contrast to diisopropylether which forms a ternary azeotrope with isopropylalcohol and water with a boiling point of 62° C. and a composition of 4.5% water, 4.5% isopropylalcohol and 91% ether, diethylether does not form a ternary azeotrope with ethanol and water; the binary azeotrope boiling at the lowest level in the presence of diethylether at normal pressure consists of 1.3% water and 98.7% ether, has a boiling point of 34.15° C. and cannot be separated into two layers. Therefore, a separation of water and the return of a reflux with below azeotropic composition are not possible.

Theoretically, it would be possible to separate the water overhead with diethylether by applying a higher than atmospheric pressure in the dehydration column, since, with increasing pressure, the binary azeotropes of diethylether and water contain more water so that, finally, a separation into two phases is effected. However, a highly energy-saving distillation into a water-free ethanol is only possible when the vapors of the rectification column can be utilized for the heating of the dehydration column which presupposes a certain pressure drop between these two columns. The pressure difference must be selected in such a fashion that the boiling temperature of the alcohol vapors of the first column is at least 6° C. higher than the sump temperature of the second column, since, otherwise, the boilers of the second column must be of an uneconomically large size or heat utilization is no longer possible when the sump temperature of the second column is higher than the boiling temperature of the alcohol vapors.

An additional disadvantage of diethylether as the entrainer for the dehydration of ethanol lies in the fact that no ether develops as a by-product in the production of ethanol by the fermentation of carbohydrates. It should be noted that ethanol produced by fermentation has the greatest importance when used as a fuel component as compared to that produced synthetically from ethylene. Therefore, the technical development towards the production, in as energy-saving a manner as possible of water-free, but otherwise not particularly well-purified ethanol, has taken other directions than that of the use of diethylether as an entrainer. Thus, K. Misselhorn reports in Chemie-Ingenieur-Technik 53 (1981), page 49 of steam consumption of 2.5 kg/liter of ethanol, corresponding to 3.2 kg steam/kg ethanol, the dehydration being achieved by operation of the rectification column under pressure and the utilization of vapor heat in the dehydration column and the entrainer recovery column.

The same principle is also applied in the European Patent Application No. 00 11 147 directed especially to ethanol for fuel use; in this instance, proceeding from an 8.5% fermentation alcohol, a specific consumption of 2.06 kg/liter of ethanol, corresponding to 2.6 kg steam/kg ethanol, is reported and a water-free alcohol is obtained by means of a rather comprehensive heat exchange of all three columns.

A thorough alcohol purification permitting another application, other than that in the field of fuel, is not really taken into consideration. However, higher alcohols building up between feeding and product drainage are drained, extracted after having been cooled with water and added, after separation, as organic phase to the fuel component while the alcohol is recovered in the first column from the additionally supplied water with the appropriate use of energy.

Furthermore, the azeotropically boiling alcohol (95% by volume is indicated as the concentration) is not drained from the head of the rectification column but at about the 50th of 60 plates as a liquid. In order to discharge easily boiling impurities (acetaldehyde is mentioned by name), a portion of the head vapors of the rectification column is not led to the column as a return flow but directly added to the water-free fuel alcohol with 95% by volume ethanol. This is possible since the applied benzenedehydration supplies easily an alcohol with less than 0.1% water as a sump product but 0.5% water can be tolerated in the addition to the fuel.

Without this being said in so many words, the known processes are obviously based on the consideration that, since the feeding of the azeotropically boiling alcohol into the dehydration column with its lower than ethanol boiling impurities leads to its enrichment in the head of this column so that, since it is essentially a question of hydrophile substances, such as acetaldehyde and methanol, finally a separation is no longer effected into two phases, a discharge of these more easily boiling substances is supposedly necessary. However, only a portion of the easily boiling impurities can be separated with the help of the measure proposed there and thus kept away from the dehydration column, and this in accordance with the selected return flow ratio, so that a portion of the head product must be processed continuously or intermittently in an additional column which is not shown in European Patent Application No. 00 11 147.

If crude alcohols are to be processed from alcoholic fermentation with higher contents of low-boiling impurities, for example, on the basis of spent sulfite liquors or saccharification of wood with up to 3% methanol, the methanol separation requires considerable additional expense relative to apparatus and energy.

A need, therefore, continues to exist for an energy-saving method for the production of dehydrated ethanol.

BRIEF DESCRIPTION OF THE DRAWINGS

The FIGURE is a schematic representation of the distillation process according to the present invention.

DETAILED DESCRIPTION OF THE PREFERRED EMBODIMENTS

Any aqueous crude alcohol can be used as the raw material for this process, whether it was developed synthetically from ethylene and water, by the fermentation of sugar or starch-containing raw materials, or from a wood by saccharification or utilization of waste sulfite liquors.

Synthetic ethanol is taken into consideration to a lesser extent in the below-given examples even though less energy is required for the separation of the water owing to the higher ethanol concentration in the synthetic mash (13% in comparison with 8.5% in the fermentation mash), since, the predominant practical importance of the present method lies in the use of agricultural and forestry raw materials for the production of ethanol for use in fuels since the essential advantage of the use of ethanol as a fuel component lies in its obtention from regenerable sources of materials. However, the problem of this use of fermentation alcohol from agricultural and forestry raw materials lies in the fact that, with the application of processing on a conventional basis, more energy is required in the form of fossil or re-growing primary energy than the energy represented by the energy content of the ethanol produced. Therefore, it is of special importance to operate in an energy-saving manner when obtaining fermentation alcohol for the purpose of its use as a fuel component in order to achieve a positive energy balance which is necessary for process feasibility.

Such an energy-saving process for the production of dehydrated ethanol by distillation has now been attained by the surprising determination that any build-up of by-products can be avoided in the head of the dehydration column if the separation of entrainer and water is effected at the same point where the enrichment of the easily boiling impurities of ethanol takes place, i.e., at the head of the rectification column. This reduces the total requirement of distillation columns to two for the production of fuel ethanol with not more than 0.5% water.

Therefore, the present invention is a distillation process for the production of dehydrated ethanol from dilute aqueous solutions obtained through alcoholic fermentation from carbonhydrate-containing raw materials or through hydration of ethylene whereby the dehydrated ethanol is suitable as a fuel additive as well as for other technical applications, characterized by the fact that the distillation is carried out in a two-column system whereby the first column—for the rectification—is operated under such a pressure that the second column—for the dehydration—is heated exclusively with vapors from the first column, in the first column the concentration of the diluted aqueous ethanol is effected to an ethanol concentration below the composition of the binary ethanol-water azeotrope, the separation of the water is effected from the lower layer of the condensed head product of the second column and the separation of the impurities and entrainers, having a lower boiling point than ethanol, is effected at the head and that of the impurities, having a higher boiling point, above the feeding point of the diluted crude alcohol and, in the second column, the dehydration is effected by means of entrainers with the addition of a fuel component or of the fuel to which the ethanol is to be added, if required, while separating the aqueous phase as a head product.

If a hydrocarbon, which is envisaged as a fuel component, is used as the entrainer, the easily boiling impurities of the ethanol are drained from the organic layer of the head product of the rectification column with the entrainer. This product can then be mixed with the fuel ethanol from the sump of the dehydration column without further treatment. The minimum addition of ethanol from the dehydration column is determined by the water content of the organic phase of the head product of the rectification column which, in its turn, depends on the entrainer which is used. As a rule, only a small portion of the sump product of the dehydration column is utilized in this manner and for this purpose as a fuel additive, the larger portion is available for all applications as a highly pure water-free alcohol.

In order to obtain an economically optimal operation of the distillation process for the production of dehydrated ethanol, the rectification column is operated under such a pressure that the strongly ethanol-enriched vapors which are led to the boiler of the dehydration column are condensed there to such an extent that a portion which is sufficient for the separation of the low-boiling substances is returned, without being condensed, into the rectification column one plate above the drainage plate of the vapors for the heating of the dehydration column while the condensed product developing in the boiler is fed partially into the dehydration column and partially to the drainage plate of the rectification column.

The upper part of the rectification column is operated at a lower pressure than the lower part whereby the difference corresponds at least to the pressure loss of the vapors in the pipes from and to the rectification column and in the boiler of the dehydration column. Preferably, the upper part is operated at almost atmospheric pressure whereby the amount not drained at the head of the column, which is returned as a return flow to the column, is returned into the column part with the higher pressure with the help of a pump if hydrostatic pressure is not sufficient.

With the reduction of the distillation columns to two, another optimization of the re-utilization of the heat is provided over the rather complicated system according to the European Patent Application No. 00 11 147. As has already been mentioned there, the energy requirement is higher at the rectification column than at the dehydration column when an attempt is made to get as close as possible to the azeotropically boiling composition already in the recitification column. When shifting the task of the separation of the entrainer and water from the lower layer of the decanter for the head product of the dehydration column to the rectification column, this imbalance is further increased since the recovery column is no longer available as the energy receiver and its energy is additionally in the vapors of the rectification column.

This balance between the energy content of the vapors of the rectification column and the requirement of the dehydration column is re-established if one relinquishes obtaining, if possible, an azeotropically boiling mixture as the product drainage of the rectification column and, instead, the steam addition to the rectification column is determined only by the complete ethanol stripping from the sump. Since it is known that the stripping energy increases very much with a decreasing ethanol concentration, supplying additional water to the distillation process must be avoided, in contrast to, for example, the fusel oil washer acording to the European Patent Application No. 00 11 147. Furthermore, the preheating of the aqueous crude alcohol fed into the rectification column must be effected as exactly as possible to the boiling temperature at the inlet plate so that no evaporation due to depressurizing and no decrease are effected of the ethanol concentration of the liquid which would mean a rise in the energy demand for stripping. In the case of a fermentation mash with, for example, 8.5% by weight of ethanol, the heat for stripping amounts to 1.8 kg steam per kg ethanol (1.4 kg steam/liter ethanol) and, in this instance, a 91% by weight alcohol is drained in the form of vapor at the 50th plate and the return flow is 2.3 times the amount of the feed into the dehydration column.

With the still high heat content of the vapors, the higher water content can be separated over the head of the dehydration column. Besides the particularly low steam requirements, the advantage of the processing mode selected here lies in the considerable savings in connection with the devices for one column and several heat exchangers in comparison with the European Patent Application No. 00 11 147.

Additionally, the following measures are of advantage for the process according to the invention The concentration of the ethanol in the first column is effected to 75–95% by weight, preferably 85–92% by weight, and the column sump is operated at a pressure of 2–8 bar.

The feeding with aqueous crude alcohol is effected in the lower range of the first column to plates 12–20 whereby the higher plates are selected with lower concentrations of ethanol. It is expedient to raise the fed crude alcohol to the temperature of the inlet plate by means of a heat exchange with the water drained from the sump of this column. The impurities which accumulate in the first column and boil at a higher point than ethanol are drained several plates above the crude alcohol feeding point and added to the fuel. If two phases are formed with this high boiler drainage, only the upper, organic phase is drained while the lower-aqueous phase is returned into the column one or several plates lower. In order to reduce the water content of the high boiler drainage, an extraction can be effected with fuel or a component of the fuel to which the ethanol shall be added eventually. In this instance, only the organic phase is drained and the aqueous one is returned to the drainage plate or lower, preferably, below the feeding point of the aqueous crude alcohol. The vapors of the first column are drained above the high boiler drainage but below the head drainage and, partially or entirely, transferred to the boiler of the second column in order to heat the latter and are condensed there to a large extent whereby the non-condensed portion is returned into the first column one plate above the vapor drainage while the condensate is led partially to the first column, to the vapor drainage plate, and partially into the upper part of the second column. The upper part of the first column, above the vapor drainage for the heating of the second column, is operated at a lower pressure than the lower part and this at least by the amount which develops as a pressure loss in the pipes from the first column to the boiler, in the boiler itself, in the necessary measuring and control systems and in the return pipes to the first column.

The head vapors of the first column which contain, besides ethanol, the impurities boiling at a lower point than ethanol and a portion of the entrainer are condensed.

A portion of the condensate returns as a reflux flow to the first column and the remainder is drained and added to the fuel. If two liquid phases develop during this process, the aqueous phase is completely returned while a portion of the organic phase is returned as a reflux flow and the other portion is drained and added to the fuel.

The second column is operated at a head presure of 0.5–2 bar, preferably atmospheric pressure. After the condensation of the head vapors of the second column, only that amount is led through the separation device—which can be appropriately arranged in the upper part of the column—which is required in order to discharge the water supplied with the feeding. The aqueous phase from the separation device of the second column is returned to the first column above the crude alcohol feeding point but below the higher boiler drainge. Crude oil blends or gasoline blends, particularly in the boiling range 80°–200° C., or pure components, such as benzene, cyclohexane or heptane, serve as entrainers for the dehydration.

In a preferred embodiment, the present invention comprises a distillation process for the production of dehydrated ethanol from a dilute aqueous solution of ethanol comprising:

feeding an impure dilute aqueous solution of ethanol to a rectification column, said dilute aqueous solution having been preheated by indirect heat exchange with the sump product withdrawn from said rectification column (by appropriate control of the steam input to the boiler of the rectification column an aqueous alcohol-free sump product can be obtained);

said rectification column operating at a sump pressure of 2–8 bar and producing an overhead vapor containing 75–95% by wt. of ethanol, preferably 85–92% by wt. of ethanol;

from a point above the feed of dilute aqueous solution to the rectification column, withdrawing a liquid stream enriched in impurities having a higher boiling point than ethanol;

said liquid stream enriched in impurities having a higher boiling point than ethanol being subjected to a phase separation wherein an aqueous phase, if formed, is returned to the rectification column at a point below the withdrawal point for the liquid stream enriched in impurities having a higher boiling point than ethanol and the organic phase is removed from the process, whereby the impurities boiling higher than ethanol introduced in said dilute aqueous solution of ethanol and accumulating in said rectification column are substantially removed;

from a point above the withdrawal of said liquid stream enriched in impurities having a higher boiling point than ethanol, but, below the top of the rectification column, withdrawing a vapor stream from the rectification column and feeding the same to the boiler of a dehydration column (as the sole heat supply to said boiler) wherein the vapor stream is partially condensed, said non-condensed portion of the vapor stream being returned to the rectification column at a point above the vapor stream withdrawal, at least a portion of the condensed portion being returned to the rectification column at the point of vapor stream withdrawal and at least a portion of the condensed portion being fed to the upper portion of the dehydration column;

from the top of the rectification column, withdrawing a vapor stream enriched in ethanol and containing entrainer and other low boiling impurities, totally condensing said vapor stream enriched in ethanol and withdrawing a portion of the organic phase so-produced from the system while recycling the remaining condensate to the top of the rectification column;

said dehydration column operating at a head pressure of 0.5-2 bar, preferably, atmospheric pressure, and withdrawing a sump product from said dehydration column comprising ethanol containing less than 0.1% by wt. water, based on ethanol;

withdrawing a vapor stream from the top of said dehydration column, totally condensing said vapor stream, admixing an entrainer selected from the group consisting of a gasoline fraction (preferably, boiling in the range of from 80° to 200° C.) cyclohexane, benzene and n-hexane with said condensed vapor stream, separating said admixture into an aqueous phase and an organic phase, withdrawing a portion of said aqueous phase in an amount to balance the water input and output of the dehydration column and feeding said portion of said aqueous phase to the rectification column at a point above the feed of dilute aqueous solution of ethanol and below the withdrawal of a liquid stream enriched in impurities having a higher boiling point than ethanol, and returning the remaining admixture of entrainer and condensed vapor stream to the top of the dehydration column.

The process development shall be described below in detail as illustrated in the FIGURE.

The mash from fermentation or synthesis (pipe 1) is preheated in the heat exchanger 2 in counter-flow to the sump product (pipe 3) of the rectification column 4 to the temperature of the feed plate in the rectification column 4 and supplied to it. The rectification column 4 is heated with steam 6 through the circulating evaporator 5. When the column is operated at a sump pressure of 5 bar, it is reasonable to have a saturated steam of 8 bar with 170° C. act on the circulating evaporator 5. The amount of steam depends on the requirement for the stripping, i.e., for obtaining an alcohol-free sump product 3. With the use of a fermentation mash with 8.5 percent by weight ethanol, it is at 1.8 kg steam per kg ethanol.

The greater amount of the vapors is drained from an upper plate through pipe 7 and supplied to the circulation evaporator 8 of the dehydration column 9. The energy supply to this column, whose head is vented to the atmosphere, is controlled by condensate level control in the circulation evaporator 8. The non-condensed portion of the vapors is supplied to the rectification columnn 4 one plate above the vapor drainage plate through pipe 10. Thus, together with the non-drained vapors of the vapor drainage plate, the necessary energy is supplied to the upper part of the rectification column 4. It is expedient to lead the totality of the vapors through the circulation evaporator 8 since an additional accumulation of the low-boiling substances takes place here during the condensation of the greater amount. The condensate of the circulation evporator 8 serves partially to feed the dehydration column 9 through pipe 11 and partially it is led to the vapor drainage plate of the rectification column 4 through pipe 12. Since there must be a pressure drop for the venting of the circulation evaporator 8 between the upper and lower part of the rectification column 4, the liquid flow from the upper part of the column to the lower part of the column is handled with the help of a pump.

Impurities boiling at a higher point than ethanol which accumulate in the zone above the crude alcohol feeding point are supplied to a separation device 15 through pipe 13, the specifically lighter organic phase is drained through pipe 17 while the aqueous phase is returned into the rectification column through pipe 18 one or several plates below the drainage plates but above the inlet of the mash. If a separation into two phases is not effected or if the water content of the organic phase should be lowered, the extraction agent—the fuel to which ethanol is to be added later is used for this purpose—is led in counter-—flow to the product drained through pipe 13 in a counter-flow extraction, instead of in a decantation—all methods customary in this technology may be used—through pipe 16. The organic phase enriched with the higher boiling substances is added to the fuel after being cooled in 14 through pipe 17 while the aqueous phase is returned into the rectification column 4 through pipe 18 and this one or several plates below the drainage plate but above the feed plate of the mash.

The dehydration column 9 supplies a pure, water-free alcohol (below 0.1% water) as sump product which is drained through pipe 19 and is used, partially or entirely, as a fuel additive.

A hydrocarbon, suitable as a fuel component, is used in every case as an entrainer for the dehydration column 9 through pipe 20. Depending on whether the total amount of the produced ethanol is to be used only as a fuel additive or whether, besides fuel ethanol, also a highly pure water-free alcohol is to be obtained, either a gasoline fraction (for example boiling average 80°-200° C.) or a pure substance (for example, cyclohexane, benzene or n-heptane) is used as the entrainer.

The head vapors of the dehydration column 9 are condensed in the condenser 21 (air or water cooler) and supplied to the head decanter 23 of the dehydration column 9 through pipe 22 which is arranged outside the column or appropriately in the interior of the column. In order to maintain the water balance in the upper part of the column—i.e., if possible, only ternary hydrocarbon-ethanol-water-azeotrope and as little as possible binary hydrocarbon-ethanol-azeotrope is to form—a corresponding portion of the condensate from 21 is led by passing the decanter 23 and supplied directly to column 9 as a reflux flow. The organic phase from 23 returns as a reflux flow to the column and the aqueous phase is led to a plate between the raw product feeding point and the lateral drainage of the higher boiling substances in the rectification column 4 through pipe 24 where the separation is effected into water, which is discharged through the sump 3 of the column, and ethanol with remaining water and entrainer.

The entrainer can be found again in the head of the rectification column 4 as a ternary azeotrope with ethanol and water and, additionally, all low-boiling impurities of the ethanol accumulate there whether they actually form azeotropes or not (for example, acetaldehyde, methanol, hydrocarbons; in the case of synthetic raw material: diethylether). After the condensation in the condenser 25 (preferably water cooling owing to the partially particular low boiling points of the impurities), the head product is supplied to the decanter 26. A portion of the organic phase is drained through pipe 27 and, after having been cooled, added to the fuel while the remainder of the organic phase is supplied, together with the aqueous phase, to the head of the column through pipe 28 as a reflux flow.

The entire amount of the entrainer is discharged through this organic phase (pipe 27) which is contained in the aqueous phase 24 of the decanter 23 of the dehydration column 9 in accordance with the amount of water to be discharged through the dehydration. It gets into the fuel with a small amount of ethanol and the low-boiling impurities of the crude alcohol as well as a remaining water content and must be continously replaced by means of fresh entrainer 20.

The minimum of the sump product 19 of the dehydration column 9 to be mixed for the fuel additive depends on the amount and composition of the necessarily developing impure fractions from the decanter of the lateral drainage 17 and the head product 27 of the rectification column 4. Reserved for the use as fuel component from the sump product 19 of the dehydration column 9 is the amount which takes the water content in the entire mixture to 0.5% of the ethanol content.

The devices, systems and materials customary in this technology are used for the distillation. For the stripper part of the first column, the plates are selected in such a way that a maximum self-purification effect is achieved by guiding the flow correspondingly and having the steam pass accordingly. The circulation evaporator 5 is expediently designed as a forced circulation evaporator in order to prevent a fouling of the pipes by means of a corresponding velocity of the flow and thus a deterioration of the heat transmission.

Owing to the large quantities required for the fuel sector, plate columns will be generally used and only exceptionally packed columns or such. When designing the plates, special attention will be paid to a low pressure loss so that the sump pressure in the first column can be as low as possible.

Having generally described this invention, a further understanding can be obtained by reference to certain specific examples which are provided herein for purposes of illustration only and are not intended to be limiting unless otherwise specified.

EXAMPLE 1

100 tons of a mash which was obtained through alcoholic fermentation using wheat as the raw material and contains, besides 8.5% by weight ethanol, 0.01% acetaldehyde and 0.04% fusel oil (mainly amylalcohol) are passed hourly through the heat exchanger 2 with a temperature of 32° C. where they are preheated to 135° C. in counter-flow to the sump product of the rectification column 4 which is operated at 4.5 bar sump pressure and are then fed to the 18th of 60 plates of the rectification column.

15.3 tons steam (saturated 8 bar, 170° C.) act hourly on the circulation evaporator 5 of the rectification column 4; i.e., it is a question of 1.8 tons steam/ton ethanol.

28.8 tons vapors are hourly drained from the 50th plate with 90% by weight ethanol, 9% by weight water, 0.1% acetaldehyde, 1% by weight cyclohexane through pipe 7 and are supplied to the circulation evaporator 8. There, 25.9 tons vapors/h condense, 12.4 tons/h of the condensate are led through pipe 11 to feed the 40th of 60 plates of the dehydration column 9, 13.5 tons/h return through pipe 12 to the vapor drainage plate of the rectification column 4 and 2.9 tons/h are led in the form of vapor through pipe 10 to the next plate above the vapor drainage plate of the rectification column 4.

0.6 tons liquid are led per hour from the 23rd plate of the rectification column 4 through pipe 13 to the extraction decanter 15 and, in counter-flow, 0.1 tons/h cyclohexane through pipe 16. At the head, 170 kg/h are drained with the composition of 57.6% by weight cyclohexane, 19.6% by weight fusel oils, 21.3% by weight ethanol and 1.5% by weight water. This mixture contains 3.7% by weight water relative to the ethanol and the fusel oil.

5.3 tons per hour aqueous phase are led from the decanter 23 through pipe 24 to the 20th plate of the rectification column 4 having the following composition: 2.2% by weight water, 53% by weight ethanol, 0.5% by weight acetaldehyde and 24% by weight cyclohexane.

The vapors drained from the head of the column 4 are condensed in the condenser 25 and separated into 2 layers in the decanter 26. 0.3 tons/h are drained from the upper layer with a composition of 78% cyclohexane, 12% ethanol, 4% acetaldehyde, 2% water and 4% hydrocarbons through pipe 27. The water content amounts to 12.5% relative to the sum of ethanol and acetaldehyde. The lower layer and the remainder of the upper layer are led from the decanter 26 as a reflux flow to the column 4.

Thus, as a whole, the by-products occur in a total amount of 470 kg/h with a total water content of 8.5 kg, from the fermentation mixed with ethanol and hydrocarbons.

8450 kg dehydrated ethanol with a water content of below 0.1% by weight are drained from the sump of the dehydration column 9. The quantity of cyclohexane to be replaced in an hourly basis amounts to 330 kg. In order to get the by-product mixture of 470 kg/h to a water content of below 0.5% by weight, the addition of a maximum of 1450 kg is necessary so that, if required, a maximum of 7 tons/h ethanol is available for other purposes than fuel additive.

EXAMPLE 2

100 tons of a mash which was obtained from a sulfite liquor and contained, besides 8.5% by weight ethanol, also 2% by weight methanol. 0.5% by weight acetaldehyde and 0.01% fusel oils, are passed per hour through the heat exchanger 2 with a temperature of 60° C. where they are preheated to 140° C. in counter-flow to the sump product of the rectification column 4 being operated at 5.0 bar sump pressure and are then fed to the 16th of 60 plates of the rectification column. The circulation evaporator 5 of the rectification column 4 is supplied by 15.3 tons steam per hour (saturated 8 bar, 170° C.), i.e. 1.8 tons steam/ton ethanol.

28.0 tons vapors are drained through pipe 7 from the 50th plate per hour with 78% by weight ethanol. 10.5% by weight methanol, 2.5% percent by weight acetaldehyde and 9% by weight water and supplied to the circulation evaporator 8. There, 24 tons vapors/h are condensed and 13 tons/h of the condensate are supplied to the 50th of 60 plates of the dehydration column 9, 11 tons/h condensate return to the vapor drainage plate of the rectification column. 4 tons/h of the vapors with 62% by weight methanol, 17% by weight acetaldehyde, 14% by weight ethanol and 7% by weight water are not condensed in the circulation evaporator 8 and reach, in the form of vapor, the plate above the vapor drainage plate of the rectification column 4 through pipe 10.

15 tons organic phase are drained per hour from the decanter 26 with the following composition: 40% by weight heptane, 40% by weight methanol, 10% by weight acetaldehyde, 9.2% by weight ethanol and 0.8% by weight water. This mixture contains 1.4% by weight water relative to the components of the mash, ethanol, methanol and acetaldehyde. The 40% by weight heptane comes to 2 tons n-heptane/h which must be continuously replaced through pipe 20.

0.12 tons liquid are led per hour to the extraction decanter 15 from the 23rd plate of the rectification column in which two phases form without adding foreign substances. The aqueous phase is supplied to the 20th plate of the rectification column 4 through pipe 18. 14 kg develop per hour as an organic layer with 71% by weight fusel oils, 15% by weight ethanol and 14% by weight water. Just as the drainage of the organic phase from the decanter 26 of the rectification column 4, this drainage is added to the mixture for the fuel ethanol. Total water contents of the drainages: 40 kg + 2 kg = 42 kg. If the mixture for the fuel is not to contain more than 0.5% by weight water relative to the sum of ethanol, methanol and acetaldehyde, almost the entire production is reserved for the fuel additive. This means that, in this special case with the extremely high methanol content in the raw product, the total amount of water-free ethanol from the sump 19 of the dehydration column 9 must be mixed into the fuel.

The return of aqueous phase 24 of the inside decanter 23 of the dehydration column 9 amounts of 10.2 tons per hour with 66% by weight ethanol, 16.9% n-heptane, 14.7% by weight water and 2.4% by weight methanol.

EXAMPLE 3

As in Example 2, 100 tons/h of a mash which was obtained from a fermented spent sulfite liquor are processed under the conditions mentioned there in the rectification column 4. In deviation from Example 2, 10 tons/h of a gasoline blend having the boiling range of 80° to 200° C. are additionally fed through pipe 11. The excess is continuously drained from the sump of the dehydration column 9 together with the dehydrated ethanol through pipe 19. With the help of this operational method, an ethanol, particularly poor in water, is produced with 0.05% water. Apart from that, the conditions are the same as indicated in Example 2.

EXAMPLE 4

100 tons of a mash which developed through alcoholic fermentation using potatoes as the raw material and which, besides 8.5% by weight ethanol, contains additionally 0.1% by weight methanol, 0.01% acetaldehyde and 0.05% fusel oils (mainly amylalcohol) are passed per hour through the heat exchanger 2 with a temperature of 32° C. where they are preheated to 135° C. in counter-flow to the sump product of the rectification column 4 which is operated at 4.5 bar sump pressure and are then fed to the 18th of 60 plates of the rectification column.

The circulation evaporator 5 of the rectification column 4 is supplied with 15.3 tons steam per hour (saturated 8 bar, 170° C.), i.e., 1.8 tons steam per ton ethanol.

28.5 tons vapors are drained through pipe (7) per hour from the 50th plate with 88.5% by weight ethanol, 9% by weight water, 0.5% by weight methanol and 2% by weight gasoline and supplied to the circulation evaporator (8). 25.5 tons vapors/h condense there and 12.4 tons of the condensate are supplied as a feeding action to the 50th of 60 plates of the dehydration column (9) and 13.1 tons condensate/h return to the vapor drainage plate of the rectification column (4). 3.0 tons/h of the vapors, with 4% by weight methanol, 86% by weight ethanol, 8% by weight water and 2% by weight gasoline, are not condensed in the circulation evaporator (8) and reach the plate above the vapor drainage plate of the rectification column (4) in the form of vapors through pipe (10).

2.5 tons of organic phase are drained per hour from the decanter (26) with the following composition: 80% by weight gasoline, 15% by weight ethanol, 4% by weight methanol, 1% by weight water and 0.3% by weight acetaldehyde.

This mixture contains approximately 5% water relative to the sum of ethanol, methanol and acetaldehyde. The gasoline portion comes to 2 tons gasoline (boiling fraction 80°–200° C.) which must be continuously replaced through pipe (20) or pipe (11).

0.6 tons liquid are supplied per hour to the extraction decanter (15) from the 23rd plate of the rectification column which is supplied by 0.1 ton gasoline per hour. The aqueous phase is supplied to the 20th plate of the rectification column (4) through pipe (18). About 170 kg are obtained per hour as an organic layer with 60% by weight gasoline, 29% by weight fusel oils, 6% by weight ethanol and 6% by weight water.

This drainage contains 17% water relative to the sum of ethanol and fusel oil. Just as the drainage of organic phase from the decanter (26) of the rectification column (4), this drainage is given into the mixture for the fuel ethanol. Total water contents of the drainages: 35 kg/h. If the fuel mixture shall not contain more than 0.5% by weight water relative to ethanol, the ethanol production is almost totally reserved for the fuel additive. This means that, in this special case with the necessity of the methanol drainage coinciding with the use of a largely blended gasoline fraction as entrainer, the entire amount of water-free ethanol must be mixed into the fuel from the sump (19) of the dehydration column (9).

The return of aqueous phase (24) of the inside decanter (23) of the dehydration column (9) amounts to 9.12 tons per hour with 60% by weight ethanol, 24.9% gasoline, 15% water and 0.1% methanol.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A distillation process for the production of dehydrated ethanol from a dilute aqueous solution of ethanol comprising:
   (a) providing a distillation system having a rectification column and a dehydration column;
   (b) feeding an impure dilute aqueous solution of ethanol to the rectification column, said dilute aqueous solution having been preheated by indirect heat exchange with the sump product withdrawn from said rectification column;

(c) operating said rectification column at a sump pressure of 2–8 bars and producing an overhead vapor containing 75-95% by wt. of ethanol;

(d) withdrawing from the rectification column a liquid stream enriched in impurities having a higher boiling point than ethanol from a point above the feed point of the dilute aqueous solution to the column;

(e) subjecting said liquid stream enriched in impurities having a higher boiling point than ethanol to a phase seperation wherein a lower aqueous phase is returned to the rectification column at a point below the withdrawal point for the liquid stream enriched in impurities having a higher boiling point than ethanol and an upper organic phase is discarded, thereby removing the impurities boiling higher than ethanol introduced in said dilute aqueous solution of ethanol and accumulating in said rectification column;

(f) withdrawing from a point above the point of withdrawal of said liquid stream enriched in impurities having higher boiling point than ethanol, and below the top of the rectification column, a vapor stream and feeding the same to the boiler of the dehydration column wherein the vapor stream is partially condensed, returning the non-condensed portion of the vapor stream to the rectification column at a point above the point of vapor stream withdrawal, returning at least a portion of the condensed vapor to the rectification column at the point of vapor stream withdrawal, and at least a portion of the condensed vapor to the upper portion of the dehydration column;

(g) withdrawing from the top of the rectification column, a vapor stream enriched in ethanol and containing an entrainer and impurities having a lower boiling point than ethanol, totally condensing said vapor stream enriched in ethanol and withdrawing a portion of an organic phase so-produced while recycling the remaining condensed phase to the top of the rectification column;

(h) withdrawing a vapor stream from the top of said dehydration column, totally condensing said vapor stream, admixing an entrainer selected from the group consisting of a gasoline fraction, cyclohexane, benzene and n-hexane with said condensed vapor stream, separating said admixture into an aqueous phase and an organic phase, withdrawing a portion of said aqueous phase in an amount to balance the water input and output of the dehydration column and feeding said portion of said aqueous phase to the rectification column at a point above the feed point of the dilute aqueous solution of ethanol and below the withdrawal point of the liquid stream enriched in impurities having a higher boiling point than ethanol, and returning the remaining admixture of entrainer and condensed vapor stream to the top of the dehydration column; and (i) operating said dehydration column at a head pressure of 0.5–2 bar and withdrawing a sump product from said dehydration column comprising ethanol containing less than 0.1% by wt. water, based on ethanol.

2. The processing according to claim 1, further comprising:

(j) extracting the liquid stream enriched in impurities having a higher boiling point than ethanol with a fuel or a component thereof, thereby obtaining a two phase system, removing the organic phase and returning the aqueous phase from the extraction of the rectification column at a point below the feed point of the dilute aqueous solution of ethanol.

3. The process according to claim 1, wherein said rectification column produces an overhead vapor containing 85-92% by wt. of ethanol.

4. The process according to claim 1, wherein said dehydration column operates at a head pressure of atmospheric pressure.

5. The process according to claim 1, wherein said rectification column is heated by steam and said steam is supplied so as to obtain an alcohol-free sump product from the rectification column.

6. A process for obtaining dehydrated ethanol from a dilute aqueous solution obtained by alcoholic fermentation of carbohydrate-containing raw materials or by the hydration of ethylene in the presence of an entrainer comprising maximizing energy-savings by the steps consisting of:

(a) providing a distillation system having one rectification column and one dehydration column;

(b) feeding to the rectification column and withdrawing therefrom the dilute aqueous solution having an ethanol concentration lower than that of the binary ethanol-water azeotrope;

(c) operating said rectification column at temperature and pressure conditions to effect the heating of the dehydration column exclusively with vapor elicited from said rectification column;

(d) withdrawing from a point of the rectification column located above the feeding point of the dilute solution, a liquid stream; said liquid enriched in impurities having a higher boiling point than ethanol;

(e) withdrawing from a point at the head of the rectification column a vapor stream enriched in entrainer and impurities having a lower boiling point than ethanol;

(f) withdrawing a vapor stream from a point above the point of withdrawal of the liquid stream and below the head of the rectification column and feeding said head vapor to the boiler of the dehydration column, wherein said vapor is partially condensed to form a head layer;

(g) withdrawing a vapor stream from the top of the dehydration column, condensing the vapor and admixing the condensed vapor with an entrainer, and returning the admixture to the top of the dehydration column;

(h) withdrawing water from the lower part of the condensed head layer of the dehydration column;

(i) discharging an ethanol sump from the bottom of the dehydration column, said sump having a water content of less than about 0.5%.

7. The process of claim 6 wherein the water content of the ethanol sump is less than about 0.1%.

8. The process of claim 7 further comprising after step (f)

(X) supplying a portion of the condensed vapor forming a head layer in the dehydration column into a decanter contained in the upper part of the column; said part being sufficient to permit the withdrawal of an equivalent volume of water in step (h).

9. The process of claim 8 further comprising: returning the water withdrawn from the lower part of the condensed head layer of the dehydration column to the rectification column at a point above the feed point of the aqueous alcoholic solution and below the point of withdrawal of the liquid steam in step (d).

10. The process of claim 6 wherein
the ethanol concentration in the rectification column is effected in step (b) to 75-95% by wt.

11. The process of claim 10 wherein
the ethanol concentration is effected to about 85-92% by wt.

12. The process of claim 6 wherein
the rectification column is operated in step (c) at a pressure of about between 2-5 bar.

13. The process of claim 6 wherein
the dilute alcoholic solution is fed to the rectification column in step (b) through the lower part of said column.

14. The process of claim 13 wherein
(I) the dilute alcoholic solution is heated prior to step (b) to the temperature inside the column at the feed point; said preheating effected by means of indirect heat exchange with water removed from the sump of the first column.

15. The process of claim 6 wherein
(II) if a two-phase system is formed by the liquid steam obtained in step (d), an upper organic phase is discarded and a lower aqueous phase is returned to the rectification column at a point below the point of withdrawal of the liquid stream.

16. The process of claim 6 further comprising:
(III) extracting the liquid stream obtained in step (d) with a fuel or a component thereof; whereby a two-phase system is formed; wherein an upper organic layer is discarded, and a lower aqueous phase is returned to the rectification column at a point below the removal point of the liquid stream and not lower than the feed point of the dilute alcoholic solution.

17. The process of claim 16 wherein the fuel utilized in step (III) is selected from the group consisting of a gasoline fraction, benzene, cyclohexane and heptane.

18. The process of claim 6, further comprising:
(IV) returning to rectification column at a point above the point of vapor stream removal of step (e), the non-condensed portion of the vapor stream fed to the boiler of the dehydration column in step (f);
(V) returning a portion of the condensed vapor stream to the rectification column at the point of vapor removal in step (f); and feeding the remaining portion of the condensed vapor to the upper part of the dehydration column.

19. The process of claim 18 wherein
(VI) the pressure in step (c) is graded; whereby the upper part of the rectification column is lower than the pressure in the lower part of the column; the pressure difference being at least equal to the loss of pressure in the boiler of the dehydration column and connectors developed by withdrawing vapor stream in step (f) and returning the non-condensed portion of the vapor stream fed to the boiler of the dehydration column in step (IV).

20. The process of claim 19 further comprising:
(VII) feeding the vapor stream withdrawn from the rectification column in step (e) to a condenser and allowing for the vapor to condense;
(VIII) returning a portion of the condensed vapor to the head of the rectification column, and discarding the remainder portion containing substantial amounts of the entrainer and impurities with a lower boiling point.

21. The process of claim 20 wherein
the dehydration column is operated at a head pressure of between about 0.5 to 2 bar.

22. The process of claim 21 wherein
the dehydration column is operated at a head pressure of atmospheric pressure.

23. The process of claim 19 wherein
(IX) if a two-liquid phase system is formed in the condenser by the vapor condensation of step (VII),
a portion of an upper organic phase is returned to the head of the rectification column and the remainder portion is discarded, and
a lower aqueous phase is completely returned to the head of the rectification column.

24. The process of claim 6 wherein
the entrainer of step (g) is a fuel selected from the group consisting of a gasoline fraction, benzene, cyclohexane and heptane.

25. The process of claim 24 wherein the gasoline fraction has a boiling range of between about 80° to 200° C.

* * * * *